United States Patent
Yoshida (10) Patent No.: US 7,168,816 B2
(45) Date of Patent: Jan. 30, 2007

(54) VEHICLE DOOR MIRROR DEVICE

(75) Inventor: Shigeki Yoshida, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 11/293,179

(22) Filed: Dec. 5, 2005

(65) Prior Publication Data

US 2006/0119960 A1 Jun. 8, 2006

(30) Foreign Application Priority Data

Dec. 7, 2004 (JP) ............................. 2004-354149

(51) Int. Cl.
*G02B 7/18* (2006.01)
*G02B 7/182* (2006.01)

(52) U.S. Cl. ...................................... 359/841; 359/877

(58) Field of Classification Search ................. 359/841
See application file for complete search history.

(56) References Cited

U.S. PATENT DOCUMENTS 5,734,517 A 3/1998 Kang 6,133,704 A * 10/2000 Yoshida et al. ............. 318/466

FOREIGN PATENT DOCUMENTS

JP 6-79647 11/1994

* cited by examiner

*Primary Examiner*—Drew A. Dunn
*Assistant Examiner*—Aline McNaull
(74) *Attorney, Agent, or Firm*—Roberts Mlotkowski & Hobbes; Thomas W. Cole (57) ABSTRACT

A vehicle door mirror device has a detent plate which is provided in the bottom of a housing having a motor actuator therein and a detent piece which is arranged at a stand or a stay. Depressions are formed in the detent plate, protrusions are formed on the detent piece, and a stopper is provided on the stand. A restricting wall is provided at the bottom portion of the housing. The range of the turning angle of the housing is set from the state where the stopper is in contact with the restricting wall to where the protrusion on the detent piece comes into contact with the depression on the detent plate. The same detent piece can be used while changing the rotation angle of the housing by changing the position of the detent piece relative to the stand, whereby the types of parts used can be reduced.

20 Claims, 4 Drawing Sheets

VEHICLE DOOR MIRROR DEVICE

CROSS-REFERENCE TO RELATED APPLICATION

This application claims priority under 35 U.S.C. 119 from Japanese Patent Application No. 2004-354149, the disclosure of which is incorporated by reference herein.

BACKGROUND OF THE INVENTION

1. Field of the Invention

The present invention relates to rearview mirror device provided at a vehicle door panel. More specifically, the present invention relates to a door mirror device that can turn between an expanded position, where the mirrored surface faces towards the approximate rear direction of the vehicle, and a folded position, where the mirrored surface faces the interior of a cab in the vehicle's widthwise direction.

2. Description of the Related Art

An example of a means for a vehicle occupant to visually confirm what is behind the vehicle includes a door mirror provided on the door panel of the vehicle. An example of this type of door mirror is disclosed in the Gazette of the unexamined Japanese Utility Model No. 6-79647. In this publication, a vehicle door mirror device is described where the visor of the door mirror is turned with the driving force of a motor. The mirror can be displaced between an expanded position (i.e., an in-use position) where the mirrored surface faces towards the approximate rear direction of the vehicle and a folded position, where the mirrored surface faces towards the inside of the cab in the approximate left-right directions of the vehicle.

The vehicle door mirror device disclosed in this publication has a door mirror frame that is turnably and axially supported on the shaft of a base plate provided at the overhanging portion of the base. Further, a ring-shaped stopper plate is arranged at the base plate coaxially with the shaft.

At one side in the axial direction of the stopper plate, inclined surfaces are formed at three places every 120° along the peripheral direction of the stopper plate. A ball is arranged on each of these inclined surfaces. The balls enter into bearing pockets formed in the frame so when the frame turns around the shaft, the balls roll on the inclined surfaces while turning with the frame around the shaft.

When the frame turns with the driving force of the motor one way around the shaft at a constant angle, the balls come into contact in the peripheral direction of the stopper plate with the walls between the adjoining inclined surfaces. Due to this, turning of the frame in one direction around the shaft is restricted.

Further, when the frame turns from this state at a constant angle around the shaft in the other direction due to the driving force of the motor, the balls enter into holes formed in the inclined surfaces on the stopper plate while a stopper formed on the base plate comes into contact with a stopper receiver formed on the frame. Due to this, turning of the frame in the other direction around the shaft is restricted.

In this manner, the frame turns between each of one direction and the other direction around the shaft until restricted, whereby, as described above, the door mirror moves between an expanded position (i.e., an in-use position) where the mirrored surface faces towards the approximate rear direction of the vehicle and a folded position, where the mirrored surface faces towards the inside of the cab in the approximate left-right directions of the vehicle.

It should be noted that the turning angle of the door mirror differs with each type of vehicle. Further, even with the same type of car, the turning angle of the door mirror changes depending on whether it is attached to the door panel on the driver side or the passenger side, or on whether the driver's seat is to the right or left side of the passenger seat.

Here, with the vehicle door mirror device disclosed in the aforementioned publication, the angle of turning of the frame (from a state where the balls are in contact with the walls to where the balls enter the holes formed in the inclined surfaces) corresponds to the turning angle of the door mirror between the expanded and folded positions. When the specifications of the turning angle of the door mirror differ, it is necessary to change the positions where the holes are formed on the inclined surfaces of the stopper plate for each different specification.

For this reason, a different stopper plate has to be prepared for each differing specification in turning angle of the door mirror. This causes an increase both in the types of parts used and the costs thereof.

SUMMARY OF THE INVENTION

The present invention was made in order to obtain a vehicle door mirror device with which the types of parts used therein can be reduced.

The first embodiment of the present invention is a vehicle door mirror device comprising: a mirror device body that comprises a mirror that reflects light and which is rotatable between two positions. One is a folded position, where the reflective surface of the mirror faces a side towards the inside of a cab in the vehicle's widthwise direction, and the other is an expanded position, where the reflective surface faces a direction inclined at a preset angle toward the approximate fore-aft direction of the vehicle or the approximate up-down direction of the vehicle. The device is further provided with: a stay that is attached at a door panel or a vehicle body in the vicinity of the door panel; a stand comprising a shaft with a preset axial direction, the stand being attached to the stay; a motor actuator that is mechanically joined to the mirror device body and which comprises a housing that is rotatably supported by the shaft, the motor actuator rotating around the shaft due to the driving force of a motor provided in the interior of the housing; a ring component provided at the inner side of a circular groove formed coaxially with the axial direction of the shaft at the bottom portion of the housing; a ring-shaped restricting component that is attached to the stand or the stay coaxially with the shaft and which is inserted into the inner side of the circular groove in a state where the housing is supported by the shaft, the ring-shaped restricting component being opposite the ring component while impeding the ring component at a first preset turning position around the shaft and restricting the turning of the housing in one direction around the shaft; and a restricting unit that impedes the housing at a second preset turning position around the shaft that differs from the first turning position and which restricts turning of the housing in the other direction around the shaft.

With the vehicle door mirror device of the present invention, when power is applied to the motor inside the motor actuator, the housing turns in the one direction around the shaft. When the housing turns in this manner and reaches the first turning position (i.e., a position corresponding to one of the expanded position and the folded position) a restricting component provided at the stand or stay impedes the ring component inside the circular groove formed at the bottom portion of the housing.

Due to this impeding of the ring component by the restricting component, turning of the housing in the one direction around the shaft is restricted. The housing, and thus the mirror device body joined to the housing, stops at the first turning position.

On the other hand, when power is applied to the motor inside the motor actuator and the motor is driven in reverse (i.e., the opposite direction) in a state where the housing has reached this first turning position, the housing turns in the other direction around the shaft. When the housing turns in this manner and reaches the second turning position, a restricting unit provided separately from the restricting component impedes the housing.

Due to this impeding of the housing by the restricting unit, turning of the housing around the other direction of the shaft is restricted. The housing, and thus the mirror device body connected to the housing, stops at the second turning position.

Restriction of turning of the housing in the other direction around the shaft is performed due to the impeding of the housing by the restricting unit. Even if the turning angle of the housing between the first and the second turning positions differs, a restricting component of the exact same structure can be applied simply by changing a placement position of the restricting component around the shaft relative to the stand or stay.

In the above-described embodiment, both the ring component and the restricting component can be made from metal.

Since the metal ring component provided in the circular groove of the housing faces opposite the metal restricting component, even if the housing is formed from, for example, a synthetic resin material, the metal ring component rubs against or comes into contact with the metal restricting component when the housing turns.

Due to this arrangement, when compared to a structure where the restricting component directly rubs against or comes into contact with the housing, abrasion and the like is less likely to occur.

Further, in the above-described embodiment, the restricting unit can be formed at the stand or the stay parallel to the shaft and inserted into a groove portion formed in the bottom portion of the housing in a state where the housing is supported by the shaft. The restricting unit can restrict the turning of the housing in the other direction around the shaft by coming into contact with an inner wall of the groove portion at the second turning position.

Due to this impeding of the inner wall of the groove by the restricting unit, turning of the housing in the other direction around the shaft is restricted. The housing, and thus the mirror device body connected to the housing, stops at the second turning position.

Furthermore, in the above-described embodiment, multiple depressions can be formed in the ring component and the angles of the depressions around the core of the ring component along the peripheral direction of the ring component from one end to the other end can be made larger than the angles around the core of the shaft from the first turning position to the second turning position. Further, multiple protrusions can be formed on the restricting component and each of the protrusions can be made to enter into the inner sides of the respective multiple depressions, such that one of the protrusions comes into contact with one of the depressions at the first turning position and restricts the turning of the housing in the one direction around the shaft. Also, the angle around the core of the restricting component, from the protrusion in contact with the depression to another adjacent protrusion in the peripheral direction of the restricting component, can be made larger than the angle around the core of the shaft from the first turning position to the second turning position.

The housing turns around the shaft due to each of the protrusions entering the inner sides of the respective multiple depressions. When the housing reaches the first turning position, one of the protrusions comes into contact with the wall facing the peripheral direction of the ring component formed towards the inner sides of the depressions of the ring component, thereby restricting the turning of the housing.

The angle around the core of the ring component from between one end of the depressions along the peripheral direction of the ring component to the other end is larger than the angle from the first turning position to the second turning position. Furthermore, the angle from the protrusion of the restricting component that comes into contact with the depression of the ring component at the first turning position to another protrusion adjacent in the peripheral direction is also larger than the angle from the first turning position to the second turning position.

Due to this arrangement, the restricting component can be appropriately applied even if the turning angle of the housing from the first turning position to the second turning position is changed without changing the structure of the component. If the turning angle of the housing is within the range of the angle between the above protrusions and the angle from one end of the depressions to the other, the same component can be used simply by changing a position of the restricting component around the shaft relative to the stand or stay.

Further, in the above-described embodiment, limiting portions that limit the displacement of the restricting component around the shaft can be formed on the stand or on the stay.

The position where the limiting portions are formed can be determined in accordance with the turning angle from the first turning position to the second turning position.

Due to this, displacement of the restricting component around the shaft relative to the stand or stay is limited by the limiting portions, and position placement of the restricting component is achieved.

Restriction of the housing turning in the other direction around the shaft is achieved due to the restricting unit impeding the housing. Even if the turning angle of the housing between the first and second turning positions differs, the restricting component of the same structure can be applied. This can be achieved by changing the positions where the limiting portions around the shaft are formed and thereby changing the position of the restricting component relative to the stand or stay.

With the vehicle door mirror device of the present invention, the same restricting component can be applied without changing the structure of the restricting component even if the angle of rotation specifications of the main body of the mirror device differ, whereby both the types of parts and the cost thereof can be reduced.

BRIEF DESCRIPTION OF THE DRAWINGS

FIGS. 2A and 2B are expanded cross-sectional drawings showing a state where the housing has reached the expanded position around the shaft.

DETAILED DESCRIPTION OF THE INVENTION

Figure 4:
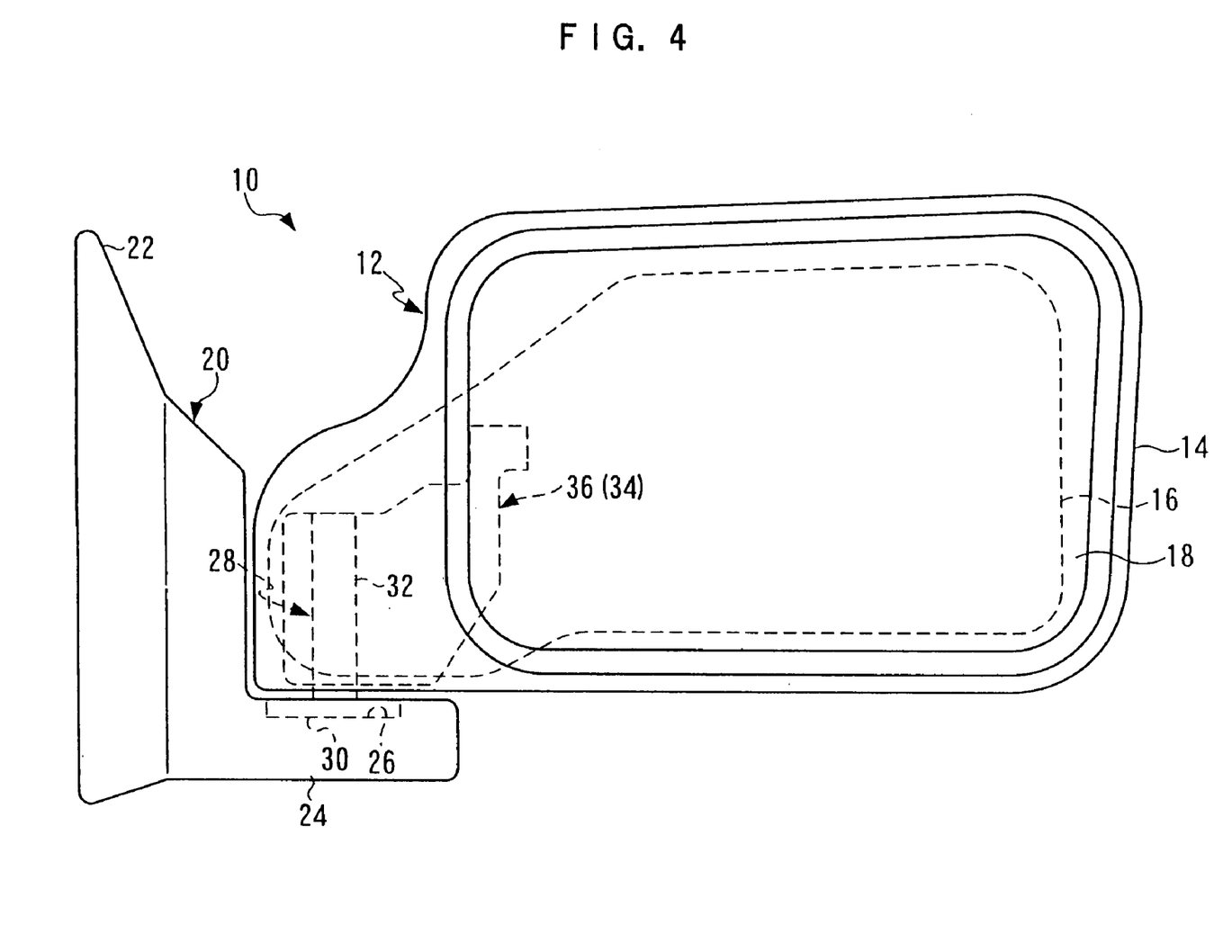
FIG. 4 is a front view of the main portions of the vehicle door mirror device of one embodiment of the present invention.

A front view of the overall structure of the vehicle door mirror device 10 of one embodiment of the present invention is shown in FIG. 4 where the device is in an exploded state.

As shown in FIG. 4, the vehicle door mirror device 10 is provided with a mirror device body 12, which is provided with a visor 14. The visor 14 is formed so as to be concave so the direction of the opening faces the approximate rear direction of the vehicle when, for example, the mirror device body 12 is in a state where it is turning toward an expanded position, which will be described later. A frame 16 is provided at the interior side of the visor 14.

The frame 16 is formed so as to be substantially board-shaped. A mirror surface angle-adjusting device (not shown) is attached to the frame 16. Further, a mirror 18 is arranged so as to be closer to the opening edge side of the visor 14 than the frame 16. The reflective surface of the mirror 18 is supported by the above-mentioned mirror surface angle-adjusting device in a state such that the reflective surface is faced in the general direction of the opening of the visor 14.

The mirror surface angle-adjusting device is provided with one or more motors. The mirror 18 is turned due to the driving force of the motor(s) around an axis whose axial direction is substantially the up and down directions of the vehicle and substantially the left and right directions of the vehicle. Due to this, the direction of the reflective surface of the mirror 18 inclines in the substantially left and right and up and down directions of the vehicle relative to the substantially rear direction of the vehicle.

Further, a stay 20 is arranged between the mirror device body 12 and a door panel (not shown) of the vehicle. The entire body of the stay 20 is formed from a material that has relatively high rigidity, such as a metal. A fixture 22 is formed on the stay 20. The stay 20 is attached to the door panel due to the fixture 22 being uniformly joined and fixed at a preset position on the door panel by a joining means such as one or more bolts.

A support 24 extends from the lower end portion of the fixture 22 in the opposite direction away from the door panel. The support 24 is formed to be substantially board-shaped. A mount 26 is formed on the support 24. The mount 26 is formed on the support 24 in a depression whose opening faces the substantially up and down directions of the vehicle, and a stand 28 is provided at the mount 26.

Figure 1:
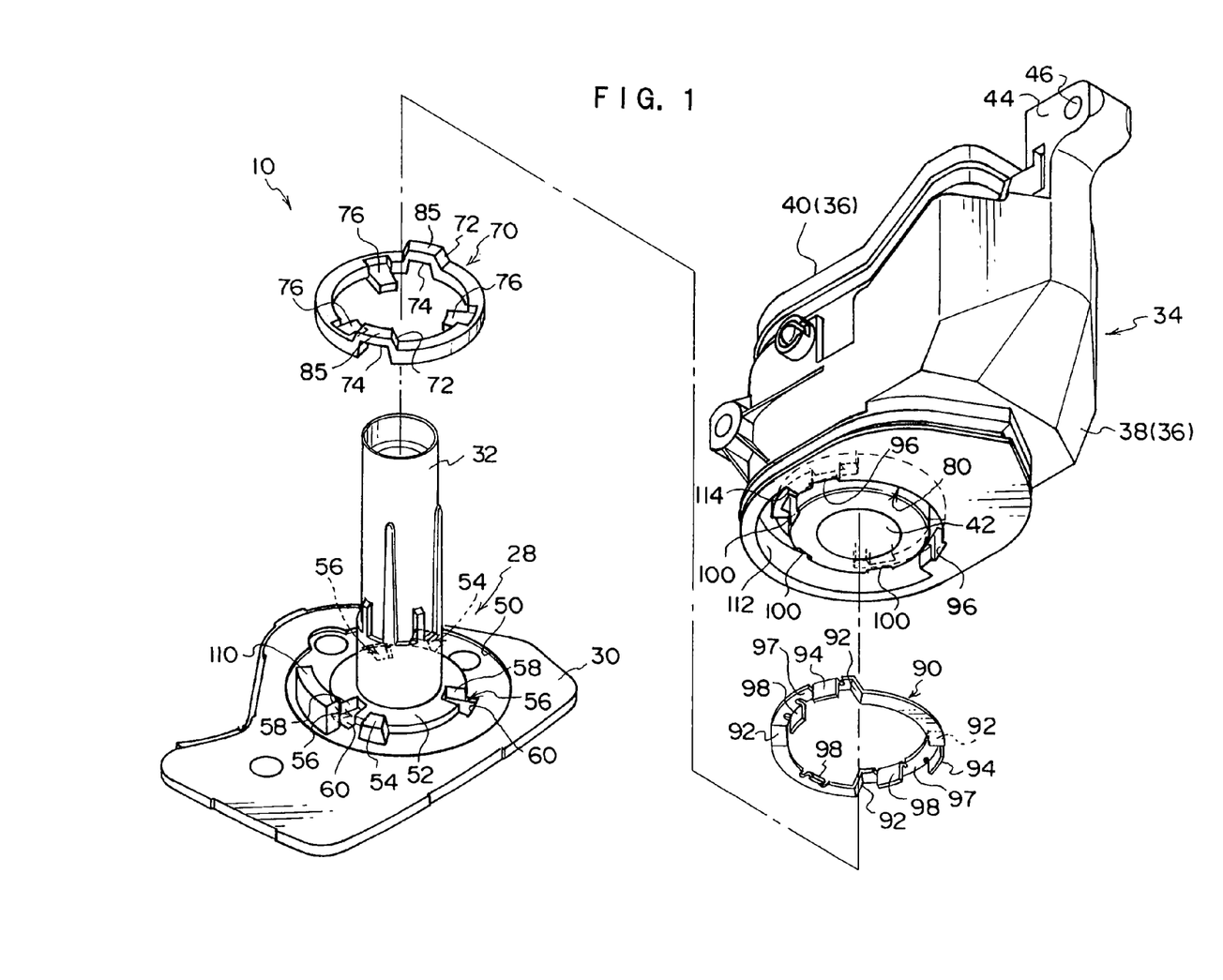
FIG. 1 is an exploded perspective drawing showing the structure of the main portions of the vehicle door mirror device of one embodiment of the present invention.

The entire body of the stand 28 shown in FIG. 1 is formed from a zinc die-cast alloy (e.g., ZDC2). Further, the stand 28 is provided with a base 30. The base 30 is formed in a flat board shape and the shape of the outer periphery thereof is made such that it can fit into the mount 26.

A shaft 32 is provided so as to stand up from the base 30 substantially towards the upper direction of the vehicle. The shaft 32 is formed into a substantially circular tube shape.

A housing 36 of a motor actuator 34 is provided at the upper side of the base 30. The housing 36 is formed from a synthetic resin material. Further, the housing 36 comprises a housing body 38 that has a bottom and opens in the substantially upper direction of the vehicle, and a cap 40 that closes or seals the upper side opening of the housing body 38. In the interior of the housing 36, a row of gears is accommodated that acts as a decelerating means or a driving force transmitting means. The row of gears is constructed from a device such as a motor, worm gear, spur gear, or worm wheel and the like.

Further, as shown in FIG. 1, a circular hole 42 is formed in the bottom portion of the housing body 38. The shaft 32 is placed through and arranged in the circular hole 42 so as to enter inside the interior of the housing 36.

At the inner side of the housing 36, among the aforementioned row of gears, the last ring-shaped gear that consists of the worm wheel or spur gear and the like is coaxially and uniformly attached to the shaft 32. When the motor is driven and the driving force of the motor is transmitted to the gear that meshes with the last gear, this gear imparts rotating force to the last gear. However, since the last gear attached to the shaft 32 is non-rotatable, the gear that imparts rotating force to the last gear ends up rotating around the shaft 32.

The device is configured such that the motor provided inside the housing 36, and thus the housing 36 itself, rotates around the shaft 32 due to the rotation of the gear that meshes with this last gear around the shaft 32.

Further, as shown in FIG. 1, a support piece 44 is formed at the outer peripheral portion of the housing body 38. A through-hole 46 is formed in the support piece 44, and the frame 16 of the mirror device body 12 is arranged so as to adjoin along the direction of penetration of the through-hole 46. A joining means such as a bolt is passed through the through-hole 46 and the frame 16 is joined and fixed to the support piece 44 with this joining means.

When the housing 36 rotates around the shaft due to the driving force of the motor, the frame 16 and also the visor 14 and the mirror 18, which are directly or indirectly fixed to the frame 16, rotate around the shaft 32.

As further shown in FIG. 1, a circular groove 50 is formed in the above-described base 30. The circular groove 50 is an approximately ring-shaped hole with a bottom, opens towards the substantially upwards direction of the vehicle and is coaxially formed relative to the above shaft 32. Further, a round base 52, with a circular outer periphery, that is coaxial relative to the shaft 32 is formed between the inner side of the circular groove 50 and the shaft 32.

A pair of protrusions 54 acting as limiting portions is formed at the outer periphery portion of the round base 52. The protrusions 54 are formed so as to face each other oppositely with the shaft 32 placed between them.

The shape of each of the protrusions 54, when viewing each of the protrusions 54 from the axis center side of the shaft 32, appears to be formed so as to have substantially rectangular forms. That is, the measurements of each of the protrusions 54 get progressively smaller towards the upwards direction of the vehicle so as to have a trapezoidal shape.

Further, positioning holes 56 acting as limiting portions are formed on the base 30. The positioning holes 56 are formed from notches 58 formed in the round base 52 and depressions 60 formed in the bottom portion of the circular groove 50.

Multiple notches 58 (in the present embodiment, three) are formed around the central core of the round base 52 at intervals having preset angles (in the present embodiment, every 120°). These notches 58 open onto the upper surface of the round base 52 and the periphery portion thereof.

Meanwhile, the depressions 60 correspond to each of the above-described notches 58 and are formed in the bottom portion of the circular groove 50, and each depression 60 continues to its corresponding notch 58. The shapes of the notches 58 and depressions 60 (i.e., the positioning holes 56) when viewed along the radial direction of the shaft 32, appear trapezoidal such that the width of each respective opening becomes progressively smaller towards the central core side of the round base 52.

A metal detent piece 70 that acts as the restricting component is provided on the above-described circular groove 50. The detent piece 70 is formed to have an overall ring shape using a forming method such as powder metallurgy.

The measurement of the outer diameter of the detent piece 70 is considerably smaller than the measurement of the inner diameter of the circular groove 50. In contrast, the measurement of the inner diameter of the detent piece 70 is slightly larger than the measurement of the outer diameter of the round base 52. For this reason, when the detent piece 70 is in a state where it is arranged on the bottom portion of the circular groove 50, the round base 52 is fit into the inner side of the detent piece 70. Displacement of the detent piece 70 along the radial direction of the round base 52 is thus restricted.

Further, a pair of bent portions 72 is formed in the detent piece 70. These bent portions 72 are formed so as to make portions of the detent piece 70 bend in the axial direction. By forming these bent portions 72, depressions 74 are formed in the detent piece 70. Each of the depressions 74 corresponds to the protrusions 54 provided on the base 30, so when the detent piece 70 is in a state where it is set on the circular groove 50, the protrusions 54 fit into the depressions 74.

Furthermore, multiple positioning pieces 76 (in the present embodiment, three) extend from the inner periphery portion of the detent piece 70 around the axial core of the detent piece 70 at preset angles (in the present embodiment, at angles of 120°).

These positioning pieces 76 are formed to correspond to the positioning holes 56 provided on the base 30. When the detent piece 70 is set on the bottom portion of the circular groove 50, the positioning pieces 76 fit into the positioning holes 56. Here, if the positioning pieces 76 and the positioning holes 56 are each formed at, for example, 120° angles, the positioning pieces 76 (i.e., the detent piece 70) can fit into the positioning holes 56 even in a state where they are rotated around the core of the round base 52 at 120°.

Nonetheless, due to the fact that the protrusions 54 are formed on the base 30 and the depressions 74 are formed in the detent piece 70, the position relation between the detent piece 70 and the circular groove 50 is limited to one, such that the positioning pieces 76 are fit into the positioning holes 56 and the protrusions 54 are fit into the depressions 74. In other words, the position relations of the protrusions 54 and the positioning holes 56 and the position relations of the depressions 74 and the positioning pieces 76 are set such that the position relations between the detent piece 70 and the circular groove 50 are limited to one.

As shown in FIG. 1, a circular groove 80 is formed at the bottom portion of the housing body 38. The circular groove 80 is formed coaxially with the circular hole 42 at the exterior side of the circular hole 42 and opens through the bottom portion of the housing body 38. The measurement of the inner diameter of the circular groove 80 is slightly larger than the measurement of the outer diameter of the above-described detent piece 70, and the detent piece 70 enters into the circular groove 80 in a state where the shaft 32 is inserted through the circular hole 42.

Figure 2A:
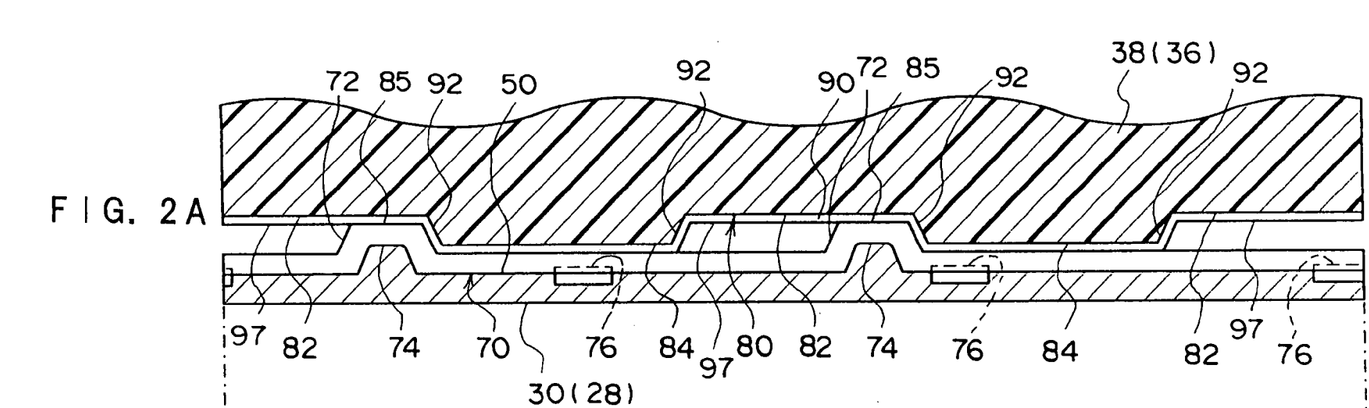
FIG. 2A is a cross-sectional drawing of the restricting component and the ring component and FIG. 2B is a cross-sectional drawing of the restricting unit.

An expanded cross-sectional diagram in the peripheral direction of the circular groove 80 is shown in FIG. 2A. Multiple circular groove depressions 82 and circular groove protrusions 84 (in the present embodiment, two of each) are alternately formed along the peripheral direction in the bottom portion of the circular groove 80. A detent plate 90 acting as the ring component is fit into the circular groove 80.

The detent plate 90 is formed entirely into a ring shape by, for example, punching out a ring from a stainless board plate. As shown in FIG. 1, multiple detent plate bent portions 92 are formed in the detent plate 90. The detent plate 90 bends or curves in the axial direction via the detent plate bent portions 92. These detent plate bent portions 92 are formed to correspond to the diagonal corners of the indented and protruded shapes of the circular groove depressions 82 and circular groove protrusions 84.

Multiple detent plate positioning pieces 94 are formed at the outer periphery portion of the detent plate 90. From a side surface view, the detent plate positioning pieces 94 appear to bend into approximate hook forms. The detent plate positioning pieces 94 extend towards the outer radial direction of the detent plate 90 from the portions connecting to the outer portion of the detent plate 90 and further, these bend or flex towards the side of one direction in the axial direction of the detent plate 90 (i.e., towards the side of the opening of the circular groove 80).

Multiple positioning grooves 96 corresponding to these detent plate positioning pieces 94 are formed at the interior peripheral portion towards the outer side in the radial direction of the circular groove 80. These are structured such that the detent plate positioning pieces 94 fit into the positioning grooves 96 in a state where the detent plate 90 is fit into the interior side of the circular groove 80.

Further, multiple detent plate positioning pieces 98 are formed at the inner peripheral portion of the detent plate 90. Like the detent plate positioning pieces 94, the detent plate positioning pieces 98, when viewed from the side surface, appear bent into hook shapes. The detent plate positioning pieces 98 extend inwards in the radial direction of the detent plate 90 from the portions connecting to the inner peripheral portion of the detent plate 90 and further, these bend or flex towards the side of one direction in the axial direction of the detent plate 90.

Multiple positioning grooves 100 are formed at the inner peripheral portion towards the inner side of the circular groove 80 in the radial direction corresponding to these detent plate positioning pieces 98. This is structured such that the detent plate positioning pieces 98 fit into the positioning grooves 100 in a state where the detent plate 90 is fit into the interior side of the circular groove 80.

As shown in FIG. 2A, the detent plate 90 is fit into the bottom portion of the circular groove 80 from the opening side of the circular groove 80 in which the circular groove depressions 82 and circular groove protrusions 84 were formed. Further, protrusions 85 of the detent piece 70 are made so as to enter into detent plate depressions 97 between the detent plate bent portions 92. The protrusions 85 are the portions on the opposite side of the depressions 74 of the bent portions 72 of the detent piece 70.

As further shown in FIG. 1, a stopper 110 acting as the restricting unit is provided so as to stand up from the bottom portion of the circular groove 50 of the base 30. The stopper 110 is formed along the radial direction of the circular groove 50 further to the exterior side than the position where the protrusions 54 are formed. Further, when viewed as a planar surface, the stopper 110 curves in a bow shape and is formed such that the center of the degree of curvature conforms with the center of the circular groove 50. That is, the surface of the stopper 110 towards the axial direction of the shaft is formed so as to be approximately parallel with a portion of the outer periphery of the shaft 32.

A restricting groove 112 corresponding to this stopper 110 is formed at the housing body 38. The restricting groove 112 is formed so as to have a larger diameter than that of the circular groove 80 and so as to be open from the bottom portion of the housing body 38. Further, the restricting groove 112, when viewed from the bottom surface, is curved such that the approximate center of the circular groove 80 is the center of the curvature of the restricting groove 112.

The stopper 110 enters into the inner side of the restricting groove 112 in a state where the shaft 32 is inserted into the circular hole 42. Furthermore, among the inner walls of the restricting groove 112, one of the inner walls along one side in the peripheral direction of the circular groove 80 (i.e., the folding or storing direction side, to be explained later) is made to be a restricting wall 114. This is structured such that when the housing 36 turns around the shaft 32 at a constant angle towards one side along the peripheral direction of the circular groove 80, the stopper 110 comes into contact with the restricting wall 114.

Figure 2B:
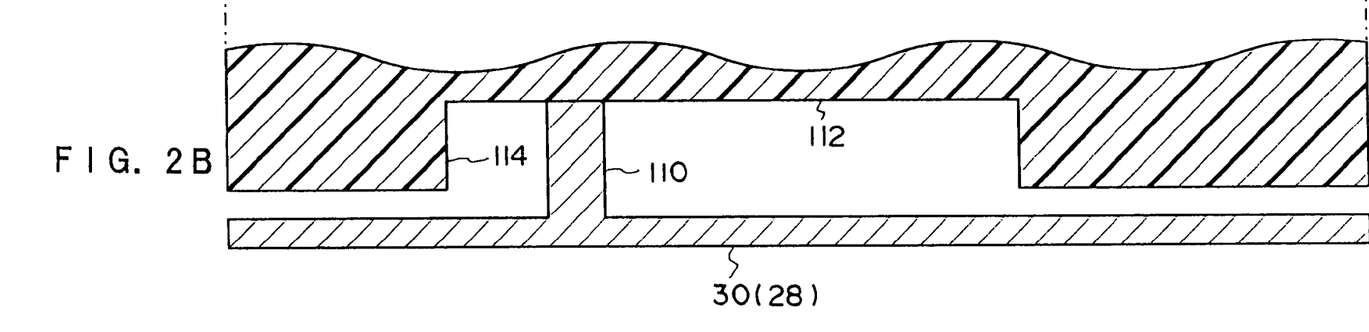

As can be seen when comparing FIGS. 2A and 2B, in the present embodiment, the positions of the positioning holes 56, protrusions 54, and stopper 110 on the base 30 and further, those of the circular groove depressions 82, circular groove protrusions 84, and restricting groove 112 on the housing body 38, are set such that the stopper 110 is positioned in the central portion of the restricting groove 112 along the peripheral direction of the circular groove 80. This is set to be positioned in a state where the bent portions 72 of the detent piece 70 are in a state of contact with either one end of the circular groove depressions 82 of circular groove 80 along the peripheral direction.

Figures 3A, 3B:
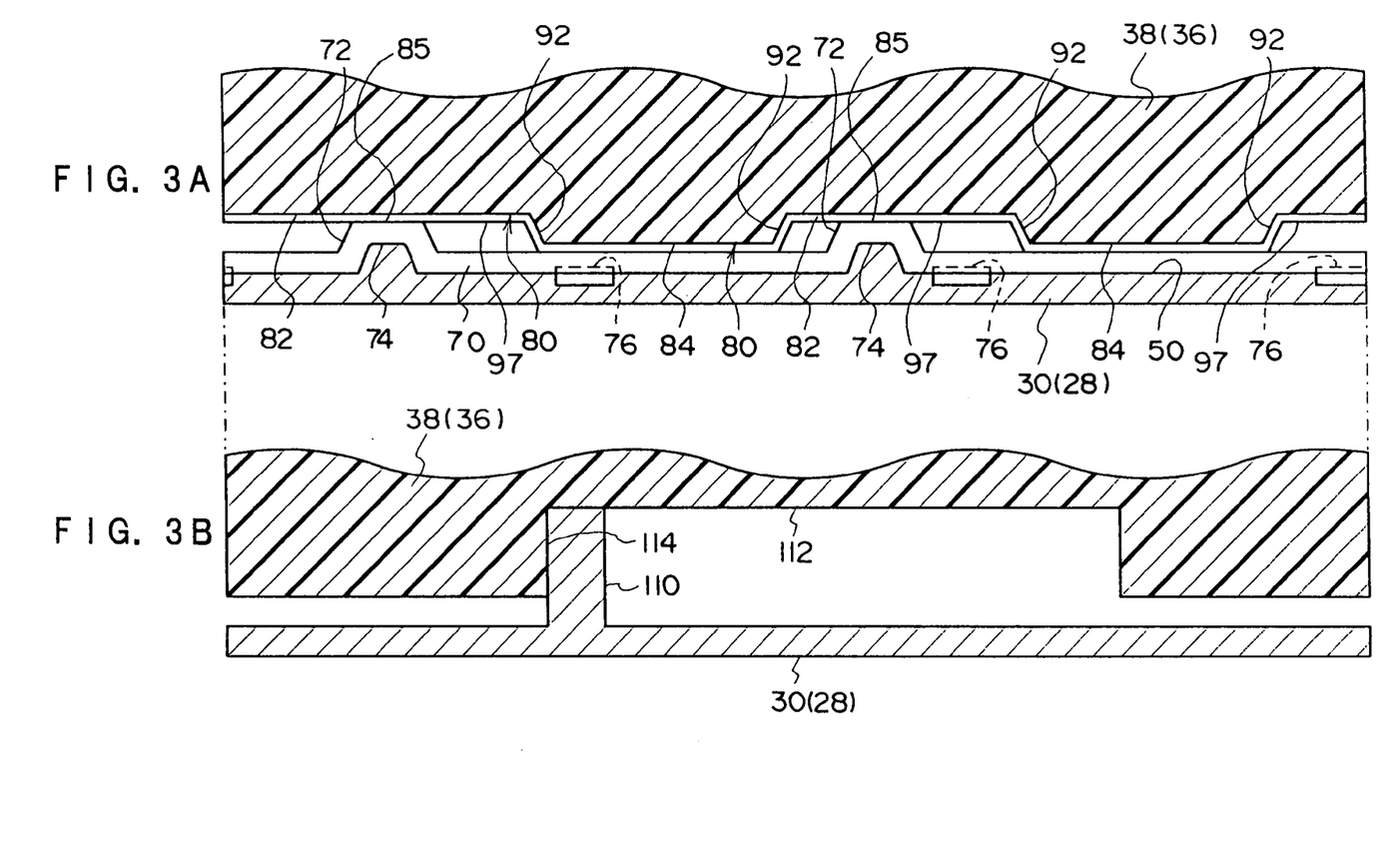
FIGS. 3A and 3B are expanded cross-sectional drawings showing a state where the housing has reached the folded position around the shaft and these drawings correspond to FIGS. 2A and 2B.

Further, as can be seen when comparing FIGS. 3A and 3B, the positions of the positioning holes 56, protrusions 54, and stopper 110 on the base 30 and further, those of the circular groove depressions 82, circular groove protrusions 84, and restricting groove 112 on the housing body 38, are set such that the bent portions 72 are positioned in the central portion of the circular groove depressions 82 along the peripheral direction of the circular groove 80. This is set to be positioned in a state where the stopper 110 is in contact with the restricting wall 114.

Explanations will be given with regard to the operation and effects of the present vehicle door mirror device 10.

With the present vehicle door mirror device 10, as shown in FIG. 3B, the opening direction of the visor 14 faces towards the interior of the vehicle cab along the substantially left-to-right direction of the vehicle (i.e., a direction that runs approximately in the vehicle's widthwise direction) in a folded state where the stopper 110 is in contact with the restricting wall 114.

In this state, when, for example, a switch formed at a preset position in the vehicle cab is operated, electrical energy is supplied to a motor provided in the housing 36, whereby the motor is driven. Rotation of the output axis of the motor is conveyed to a row of gears.

Since the last gear of the row of gears is coaxially and uniformly attached to the shaft 32, when the rotation force (i.e., the driving force of the motor) is conveyed to the gear that meshes with the last gear, this gear continues to self-rotate while revolving around the last gear (i.e., around the shaft 32).

In this manner, the gear that meshes with the last gear revolves around the shaft 32, whereby the housing 36 on which the row of gears (except for the last gear and the motor) is attached rotates around the shaft 32. Furthermore, the frame 16, and thereby the visor 14 and the mirror 18, rotate in one direction around the shaft 32 (hereafter, this direction is referred to as the "expanding direction" for ease of explanation).

Consequently, the visor 14 rotates in the expanding direction in this manner whereby the opening direction of the visor 14 reaches an expanded state where it faces the approximate rear-direction side of the vehicle. When this occurs, the housing 36 has reached the expanded position around the shaft 32.

As shown in FIG. 2A, the protrusions 85 of the detent piece 70 (i.e., the bent portions 72) reach the end portion of the circular groove depressions 82 in this state and come into contact with the detent plate depressions 97 of the detent plate 90 (i.e., the detent plate bent portions 92). For this reason, the housing 36 cannot rotate anymore than this in the expanding direction. When the housing 36 is restricted from rotating in the expanding direction in this manner, a situation occurs where, for example, excess current flows to the motor, whereby a drive control circuit of the motor detects the excess current and blocks the current (i.e., the provision of electrical power) to the motor.

In this state, the visor 14 faces substantially towards the rear side of the vehicle and the mirrored surface of the mirror 18 also faces substantially towards the rear side of the vehicle, so, for example, the vehicle occupant in the vehicle cab can visually confirm the conditions towards the rear side of the vehicle by looking at the mirror 18.

If the switch inside the vehicle cab is operated when the device is in such an expanded state, electrical power is supplied once again to the motor. Due to this, current opposite to that used when the housing 36 rotates in the expanding direction flows to the motor and the motor is driven in reverse. The housing 36 rotates around the shaft 32 due to the motor being driven in reverse whereby the frame 16, and thus the visor 14 and the mirror 18, rotate towards the folding direction, which is opposite to the expanding direction.

Next, due to the rotation of the visor 14 in this manner in the folding direction, the opening direction of the visor 14 faces the inner cab side in the vehicle's approximate left and right directions (i.e., the approximate widthwise direction of the vehicle) and comes into the folded state, whereby the housing 36 reaches the folded position around the shaft 32.

In this state, as shown in FIG. 3B, the restricting wall 114 comes into contact with the stopper 110. The housing 36 cannot rotate anymore than this in the folding direction. When rotation of the housing 36 in the folding direction is restricted in this manner, a situation occurs where, for example, excess current flows to the motor, whereby the drive control circuit of the motor detects the excess current and blocks the current (i.e., the provision of electrical power) to the motor.

With the present vehicle door mirror device 10, the housing 36 formed, as described above, from a synthetic resin material rotates on the base 30 of the stand 28 formed from a metal. However, when the housing 36 faces opposite the metal detent piece 70 on the base 30 as described above (more precisely, on the bottom portion of the circular groove 50), the metal detent plate 90 fits into the circular groove 80. Accordingly, the device is structured such that when the housing 36 rotates, the detent plate 90 rubs against the detent piece 70.

The detent plate 90 and the detent piece 70, which are each formed from a metal, rub against each other when the housing 36 rotates, whereby the generation of friction and the like can be effectively suppressed as compared to a structure where the housing 36 rubs against the base 30. Accordingly, the resilience of the device can be markedly improved.

Further, with the present embodiment, restriction of the turning of the housing 36 in the expanding direction occurs due to the inclined planes of the protrusions 85 of the detent piece 70 (i.e., the bent portions 72) facing towards the expanding direction side coming into contact with the surfaces of the detent plate depressions 97 of the detent plate 90 (i.e., the detent plate bent portions 92) facing towards the folding direction side. Nonetheless, restriction of the turning of the housing 36 towards the folding direction can be performed due to contact between the stopper 110 and the restricting wall 114.

In other words, the angle of rotation of the housing 36 between the expanded position and the folded position is determined by the angle created between the position of the inclined planes of the bent portions 72 of the detent piece 70 facing towards the direction of the expanding direction side and the surfaces of the detent plate bent portions 92 opposite this inclined plane (in a state where the housing 36 has reached the folded position with the axis center of the shaft 32 as the core). The measurements of the protrusions 85 (i.e., the bent portions 72) along the peripheral direction of the detent piece 70 play no part in determining the angle of rotation.

Accordingly, even if the angle of rotation of the housing 36 between the expanded position and the folded position changes due to, for example, the device being attached to a different type of car, all that needs to be changed is the position of arrangement of the detent piece 70 around the axial center of the shaft 32. In other words, essentially the same detent piece 70 can be used simply by changing the positions where the positioning holes 56 of the base 30 and the protrusions 54 are formed.

Further, even in the case of the same type of car, where differences in the setting of the angle of rotation of the housing 36 occur due to cases such as the device being used on a vehicle with right-hand steering or left-hand steering, or due to the present vehicle door mirror device 10 being provided on the door panel on the driver side or the passenger side, the same detent piece 70 can be applied.

This concludes the explanation of how with the vehicle door mirror device of the present invention, the structure of the restricting component can be applied without change even if the angle of rotation specifications of the main body of the mirror device differ, whereby both the types of parts and the cost thereof can be reduced.

What is claimed is:

1. A vehicle door minor device comprising:
    a mirror device body that comprises a mirror that reflects light and which is rotatable between a folded position where the reflective surface of the mirror faces a side towards the inside of a cab in the vehicle's widthwise direction and an expanded position where the reflective surface faces a direction inclined at a preset angle toward the approximate fore-aft direction of the vehicle or the approximate up-down direction of the vehicle;
    a stay that is attached at a door panel or a vehicle body in the vicinity of the door panel;
    a stand comprising a shaft with a preset axial direction, the stand being attached to the stay;
    a motor actuator that is mechanically joined to the minor device body and which comprises a housing that is rotatably supported by the shaft, the motor actuator rotating around the shaft due to the driving force of a motor provided in the interior of the housing;
    a ring component provided at the inner side of a circular groove formed coaxially with the axial direction of the shaft at the bottom portion of the housing;
    a ring-shaped restricting component that is assembled to the stand or the stay coaxially with the shaft and which is inserted into the inner side of the circular groove in a state where the housing is supported by the shaft, the ring-shaped restricting component being opposite the ring component while impeding the ring component at a first preset turning position around the shaft and restricting the turning of the housing in one direction around the shaft;
    a restricting unit that impedes the housing at a second preset turning position around the shalt that differs from the first turning position and which restricts turning of the housing in the other direction around the shaft; and
    wherein said ring-shaped restricting component includes positioning portions which interfit with fitting portions of said stand or stay to prevent rotation of said ring-shaped restricting component relative to said stand or stay such that a same ring-shaped restricting component may be assembled on to the stands or stays of other vehicle door mirror devices having said fitting portions at different angular positions around said shaft.

2. The vehicle door mirror device of claim 1, wherein the ring component is made of metal.

3. The vehicle door minor device of claim 1, wherein the restricting component is made of metal.

4. The vehicle door minor device of claim 1, wherein the restricting unit impedes the housing directly or indirectly at the second turning position around the shaft and restricts the turning of the housing in the other direction around the shaft.

5. The vehicle door mirror device of claim 1, wherein the restricting unit is formed at the stand or the stay parallel to the shaft and is inserted into a groove portion formed in the bottom portion of the housing in a state where the housing is supported by the shaft, and the restricting unit restricts the turning of the housing in the other direction around the shaft by coming into contact with an inner wall of the groove portion at the second turning position.

6. The vehicle door mirror device of claim 1, wherein multiple depressions are formed in the ring component and the angles of the depressions around the core of the ring component along the peripheral direction of the ring component from one end to the other end are larger than the angles around the core of the shaft from the first turning position to the second turning position; and
    multiple protrusions are formed on the restricting component and each of the protrusions enter into the inner sides of the respective multiple depressions, where one of the protrusions comes into contact with one of the depressions at the first turning position and restricts the turning of the housing in the one direction around the shalt while the angle around the core of the restricting component, from the protrusion in contact with the depression to another adjacent protrusion in the peripheral direction of the restricting component is larger than the angle around the core of the shaft from the first turning position to the second turning position.

7. The vehicle door mirror device of claim 1, wherein limiting portions that prevent the displacement of the restricting component around the shaft are formed on the stand or on the stay.

8. The vehicle door mirror device of claim 7, wherein the positions where the limiting portions are formed are determined in accordance with the turning angle from the first turning position to the second turning position, whereby the same restricting component can be used even when the turning angle differs.

9. The vehicle door minor device of claim 2, wherein the restricting component is made of metal.

10. The vehicle door mirror device of claim 9, wherein the restricting unit is formed at the stand or the stay parallel to an outer periphery of the shalt and placed into a groove portion formed in the bottom portion of the housing in a state where the housing is supported by the shaft, and turning of the housing in the other direction around the shaft is restricted due to the restricting unit coming with an inner wall of the groove portion at the second turning position.

11. The vehicle door minor device of claim 9, wherein multiple depressions are formed in the ring component and the angles of the depressions around the core of the ring component along the peripheral direction of the ring component from one end to the other end are larger than the angles around the core of the shaft from the first turning position to the second turning position; and multiple protrusions are formed on the restricting component and each of the protrusions enter into the inner sides of the respective multiple depressions, where one of the protrusions comes into contact with one of the depressions at the first turning position, and restricts the turning of the housing in the one direction around the shaft while the angle around the core of the restricting component, from the protrusion in contact with the depression to another adjacent protrusion in the peripheral direction of the restricting component, is larger than the angle around the core of the shaft from the first turning position to the second turning position.

12. The vehicle door mirror device of claim 9, wherein limiting portions that limit the displacement of the restricting component around the shaft are formed on the stand or on the stay.

13. The vehicle door mirror device of claim 12, wherein the positions where the limiting portions are formed are determined in accordance with the turning angle from the first turning position to the second turning position, whereby the same restricting component can be used even when the turning angle differs.

14. The vehicle door mirror device of claim 10, wherein multiple depressions are formed in the ring component and the angles of the depressions around the core of the ring component along the peripheral direction of the ring component from one end to the other are larger than the angles around the core of the shaft from the first turning position to the second turning position; and multiple protrusions are formed on the restricting component and each of the protrusions enter into the inner sides of the respective multiple depressions, where one of the protrusions comes into contact with one of the depressions at the first turning position, and restricts the turning of the housing in the one direction around the shaft while the angle around the core of the restricting component, from the protrusion in contact with the depression to another adjacent protrusion in the peripheral direction of the restricting component, is larger than the angle around the core of the shaft from the first turning position to the second turning position.

15. The vehicle door mirror device of claim 11, wherein limiting portions that limit the displacement of the restricting component around the shaft are formed on the stand or on the stay.

16. The vehicle door minor device of claim 15, wherein the positions where the limiting portions are formed are determined in accordance with the turning angle from the first turning position to the second turning position, whereby the same restricting component can be used even when the turning angle differs.

17. The vehicle door mirror device of claim 14, wherein limiting portions that limit the displacement of the restricting component around the shalt are formed on the stand or on the stay.

18. The vehicle door mirror device of claim 17, wherein the positions where the limiting portions are formed are determined in accordance with the turning angle from the first turning position to the second turning position, whereby the same restricting component can be used even when the turning angle differs.

19. The vehicle door mirror device of claim 1, wherein the positioning portions are one of a pattern of protrusions and holes and said fitting portions are the other of a complementary-shaped pattern of protrusions and hales.

20. The vehicle door mirror device of claim 1, wherein a same pattern of protrusions and holes fanning said complementary-shaped fitting portions is present at different angular orientations around said shaft in different vehicle door minor devices.

* * * * *